United States Patent
Slutz et al.

(10) Patent No.: US 6,892,334 B2
(45) Date of Patent: May 10, 2005

(54) METHOD FOR DETERMINING DESKEW MARGINS IN PARALLEL INTERFACE RECEIVERS

(75) Inventors: Mark Slutz, Colorado Springs, CO (US); William Schmitz, Monument, CO (US); David So, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 458 days.

(21) Appl. No.: 10/214,801

(22) Filed: Aug. 6, 2002

(65) Prior Publication Data

US 2004/0030964 A1 Feb. 12, 2004

(51) Int. Cl.[7] .............................................. G11B 20/20
(52) U.S. Cl. ...................................... 714/700; 714/798
(58) Field of Search ................................ 714/700, 798; 716/6; 710/305; 385/24

(56) References Cited

U.S. PATENT DOCUMENTS

| | | | | |
|---|---|---|---|---|
| 3,456,237 A | * | 7/1969 | Collins ........................ | 714/700 |
| 6,536,025 B2 | * | 3/2003 | Kennedy et al. ................ | 716/6 |
| 6,636,993 B1 | * | 10/2003 | Koyanagi et al. ............ | 714/700 |
| 6,760,803 B1 | * | 7/2004 | Gauvin et al. .............. | 710/305 |
| 6,798,946 B2 | * | 9/2004 | Bonja et al. .................. | 385/24 |

* cited by examiner

*Primary Examiner*—David Ton
(74) *Attorney, Agent, or Firm*—Cochran, Freund & Young

(57) ABSTRACT

Disclosed is a method for automatically testing the deskew setting for the clock in a parallel data interface. The deskew value is varied to a high and a low limit to the point where errors occur when transmissions occur. After determining the high and low operable limits of the deskew values, an optimum deskew setting may be determined and set for the system. The present invention may be used as a design verification technique, for optimizing a system after integration, or for further optimization of the deskew value after performing a training pattern for optimizing transmission performance.

16 Claims, 3 Drawing Sheets

METHOD FOR DETERMINING DESKEW MARGINS IN PARALLEL INTERFACE RECEIVERS

BACKGROUND OF THE INVENTION a. Field of the Invention

The present invention pertains generally to parallel interfaces and specifically to deskewing incoming timing signals.

b. Description of the Background

Ultra320 SCSI is a parallel interface standard for the connection of computer peripherals such as hard disk storage devices. The Ultra320 SCSI interface is a parallel interface containing multiple wires that simultaneously transmit data and clock signals. The inevitable result is that wire lengths and impedance are different for the signal wires so that one signal reaches a destination before another. The high speed of the Ultra320 SCSI interface causes such differences in signal timing to be a problem to the point where a training pattern is used to measure and correct the imbalances in the SCSI bus. Particularly, the training pattern is used to find delays on any of the particular wires. If such delays are found, compensations are made in future transmissions based on the delays measured during the training pattern.

During a transmission, a clock signal and several data signals are transmitted simultaneously. The receiver may read the data after a half-period delay in the clock signal. A method to determine the amount of delay to apply would be to measure the period of the clock and read the data at exactly half of that period. Any offset from the half period measurement is known as the deskew value.

In chip-based implementations of the Ultra320 SCSI standard, the signals may not be reachable to probe with an oscilloscope or other external measurement tool because the receiver deskew logic are inside the chip. Hence, the designer may need alternative ways of optimizing the deskew parameters.

It would therefore be advantageous to provide a system and method for determining the optimum deskew for reading the data signals when the signals are within a chip and cannot be physically probed with a measurement device. It would be further advantageous to be able to optimize the deskew for an assembled system.

SUMMARY OF THE INVENTION

The present invention overcomes the disadvantages and limitations of the prior art by providing a system and method for determining the optimum deskew settings for reading data signals on a parallel interface. The method involves changing the deskew settings to high and low limits and detecting when errors begin to occur. The deskew is then set to an optimum value without probing of the clock and data signals.

The method relies on the functionality of the entire system, and effects such as cable lengths, noise in the system, the performance of the various components connected along the parallel bus, and other factors may be included in finding the optimum performance of the deskew settings. Further, the deskew calculation using the present invention may be performed at various intervals, increasing the overall system performance and ensuring that performance will be optimum.

The present invention may therefore comprise a method of empirically setting an optimum deskew setting on a parallel bus receiver comprising: setting a deskew setting to a central value; performing at least one read command; repeating the process of incrementing the deskew setting by a first incremental amount and performing the read command until the read command encounters at least one failure; saving the deskew setting as the high value; resetting the deskew setting to the central value; repeating the process of decrementing the deskew setting by a second incremental amount and performing the read command until the read command encounters at least one failure; saving the deskew setting as the low value; and calculating the optimum deskew setting using the high value and the low value.

The present invention may further comprise a method of empirically setting an optimum deskew setting on a parallel bus receiver in an integrated system comprising: connecting a first device with a parallel interface to at least a second device with a parallel interface; setting a deskew setting on a parallel receiver of at least one device to a central value; performing at least one read command; repeating the process of incrementing the deskew setting by a first incremental amount and performing the read command until the read command encounters at least one failure; saving the deskew setting as the high value; resetting the deskew setting to the central value; repeating the process of decrementing the deskew setting by a second incremental amount and performing the read command until the read command encounters at least one failure; saving the deskew setting as the low value; calculating the optimum deskew setting using the high value and the low value; and setting the optimum deskew setting to the receiver.

The present invention may further comprise a receiver for a parallel bus capable of adjusting the optimum deskew value comprising: a clock signal input line; a plurality of data input lines; and a capability of setting a deskew setting to a central value, performing at least one read command, repeating the process of incrementing the deskew setting by a first incremental amount and performing the read command until the read command encounters at least one failure, saving the deskew setting as the high value, resetting the deskew setting to the central value, repeating the process of decrementing the deskew setting by a second incremental amount and performing the read command until the read command encounters at least one failure, saving the deskew setting as the low value, and calculating the optimum deskew setting using the high value and the low value.

The advantages of the present invention are that the optimum deskew values may be determined for any system configuration. The present invention may be adapted to be used in a design verification environment as well as an optimization routine that may be used when a computer system is configured.

DETAILED DESCRIPTION OF THE INVENTION

Figure 1:
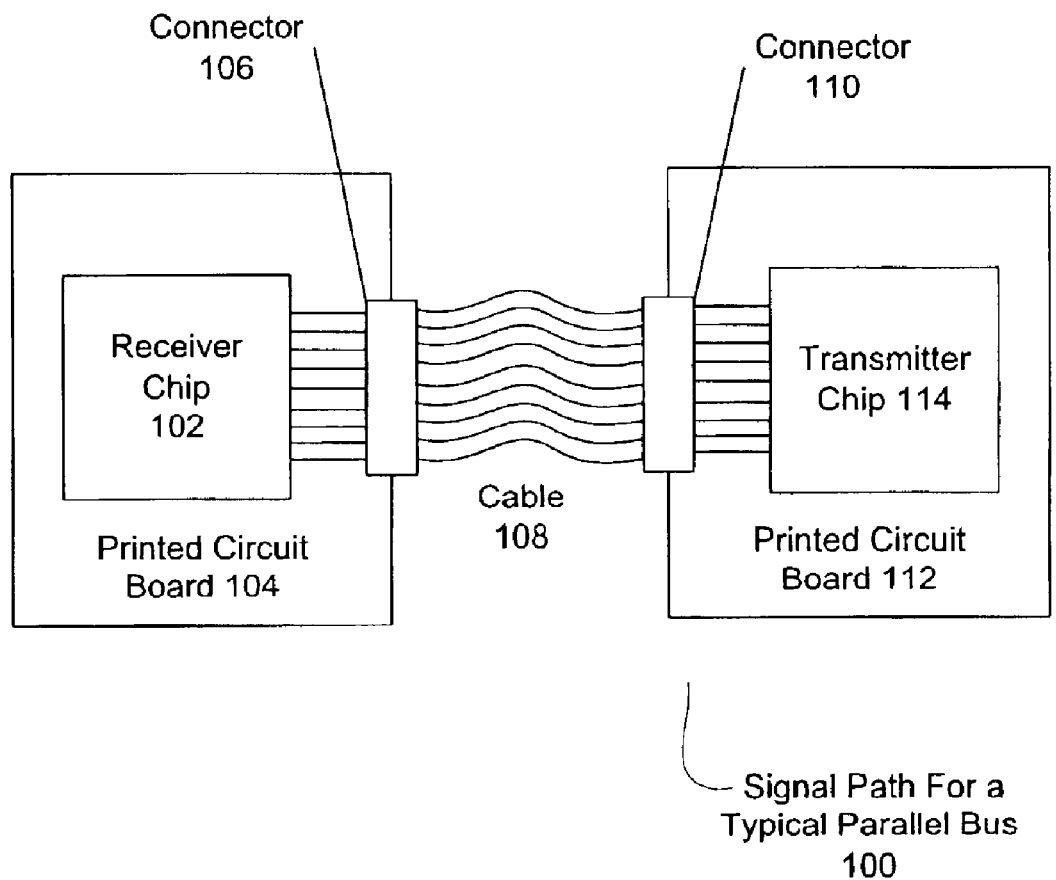
FIG. 1 is an illustration of a simplified representation of the signal paths for a parallel bus similar to SCSI.

FIG. 1 illustrates a simplified representation 100 of the signal paths for a parallel bus similar to SCSI. A receiver chip 102 is mounted on a printed circuit board 104 connected by a connector 106 to a cable 108. Another connector 110 connects to a printed circuit board 112 on which is mounted a transmitter chip 114. The representation 100 may be typical of a SCSI disk drive transmitting to a disk controller card.

The representation 100 shows several components and connectors that may be involved in transmitting a signal from a transmitting chip 114 to a receiving chip 102. In addition to the connections described in the representation 100, many signal conditioning and other electrical components may be present on one of the printed circuit boards 104 or 114.

In a parallel bus such as SCSI, a clock signal is used by a receiving chip 102 to determine when to read the parallel data signals. In the particular embodiment of Ultra320 SCSI, the clock signal is in phase with the data signals and the receiver chip 102 must delay until the clock signal is 90 degrees out of phase with the data signals to perform the read. Problems occur when the data signals and the clock signals are not perfectly synchronized. For example, if one of the data signals is delayed due to a longer trace route, the receiver may try to read the data signal when the data signal has not achieved the proper state, thus causing an error. The clock signal may be shifted or deskewed to optimize the chance of success of reading the incoming data lines.

When debugging receiver circuitry, a designer may wish to apply a logic analyzer, oscilloscope, or other electronic instrumentation to visualize and evaluate the performance of the clock and data signals. When such circuitry is embedded into a chip, the internal timings of the signal traces are not accessible to the designer to evaluate with the help of an external piece of analysis equipment. Further, the margin, or the available tolerance in the circuit may not be known.

In another case, the combination of the various components and circuitry on the printed circuit boards 104 and 112, the connectors 106 and 110, plus the cable 108 all combine to cause some shift in the clock or individual data signals which may cause some transmission problems. The manufacturing variances of these components as well as the designed-in variances in signal lengths may lead to transmission problems.

Figure 2:
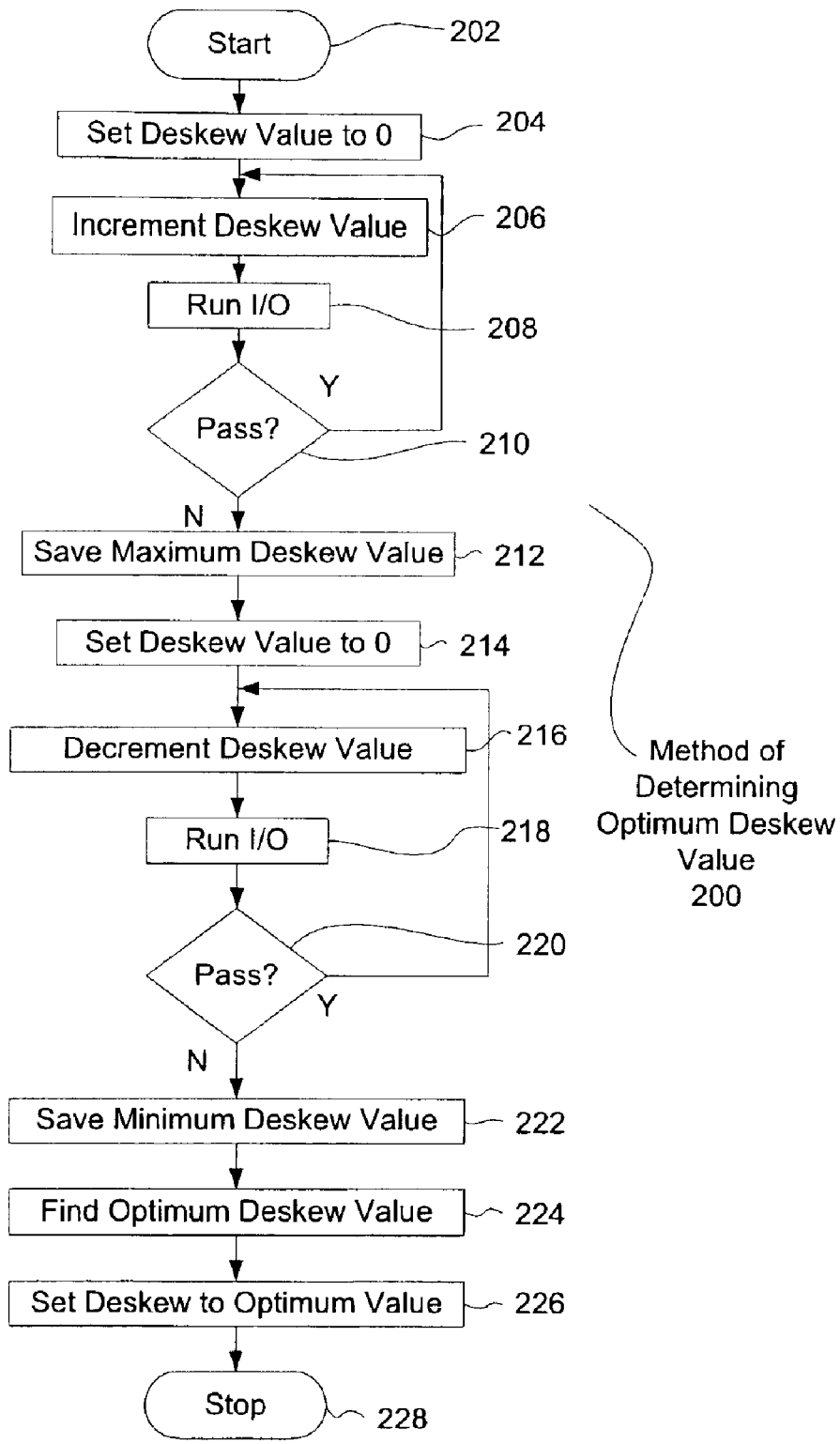
FIG. 2 is an illustration of a workflow diagram of an embodiment of the present invention of a method of determining optimum deskew values.

FIG. 2 illustrates a workflow diagram of an embodiment of a method 200 of determining the optimum deskew value. The process starts 202 and the deskew value is set to zero 204. The deskew value is incremented 206 and the receiver is exercised 208 to determine if the current deskew value passes or fails 210. If the deskew value passes, the value is incremented again 206 until a failure occurs. When a failure occurs, the value is saved as the maximum deskew value 212.

The deskew value is reset to zero 214, then decremented 216 and exercised 218 to see if the deskew value passes 220. If the value passes, the value is decremented 216 again until a failure occurs. When a failure occurs, the value is saved as the minimum deskew value 222. The optimum deskew value is then set for the device 224 and the process ends 226.

The deskew value begins the method 200 at a nominal value. In some cases, the nominal value may be zero, or may be a different value. The nominal value may be set during a training process wherein signals are sent between two devices and various parameters may be set for proper transmission. The method 200 may be used to further refine the deskew value and thereby further optimize it.

The process slowly increments the deskew value until an error occurs, then decrements the deskew value until another error occurs. With an upper and lower bounds on the deskew value, the optimum deskew value may be set. The inventive process determines the available margin in the system. The margin may be used as a measure of system performance. Further, the deskew value may be chosen so that the margin is balanced on both sides of the selected deskew value.

The optimum deskew value is determined by empirical methods. In other words, physical factors such as minute, non-linear capacitance, inductance, and resistance in the signal lines, slight trace length differences, or other physical limitations are taken into account when the deskew value is set. These minute factors may be due to the design and layout of a chip or printed circuit board. In some cases, external environmental factors may also contribute to variations in performance.

The failures may be determined by sending test patterns between a transmitting device and the receiver. In some cases, actual data may be sent and errors may be determined by an error checking mechanism such as parity error detection, cyclic redundancy check (CRC), or other known methods.

The current method 200 assumes that no errors occur when the deskew value is set to zero. In other embodiments, the deskew value may begin at a known good deskew value.

The optimum deskew value may be the simple average or midpoint of the upper and lower deskew values. In some cases, the optimum deskew value may be biased to the upper or lower limit. For example, if it is known that the optimum deskew value is generally biased 10% towards the upper limit, then the optimum may not be a simple average of the upper and lower values.

An embodiment of the present invention may be performed as a design verification test. In the case where the circuitry is contained in a silicon chip, the signals may not be available for probing with a piece of test equipment. As such, the available margin in the circuitry may not be known. Further, if the dies for a chip are already manufactured, the present invention will help the designer determine the exact optimum deskew setting for the chip, taking into account various signal lengths and such that are already designed into the chip. The margin in the design may be approximated by the difference between the maximum deskew value and the minimum deskew value. A measure of the design performance may be the margin determined from the minimum and maximum deskew values. In the case of design verification, embodiments may be implemented in a temporary firmware program that is executed only in the design laboratory.

Another embodiment may be as a configuration optimization routine that is executed after a computer system is integrated. For example, when several SCSI disk drives are attached to a controller, the controller may execute the present method 100 to determine the optimum deskew value for that configuration. In such a case, factors such as cabling and the precise performance of each individual SCSI device connected to the controller may be factored into the optimization routine. The embodiment may be implemented as a firmware function in the receiver chips of the devices in the system, or the embodiment may be a software routine executed by the configuring technician. The optimization routine may be executed with one device on the SCSI bus or may be executed on several devices simultaneously.

In a third embodiment, the present invention may be executed in conjunction with a training pattern test, such as the training pattern test implemented in the Ultra320 SCSI standard. In such a case, the present embodiment may be executed at each time the Ultra320 SCSI standard training pattern is executed or other frequency as may be desired.

Figure 3:
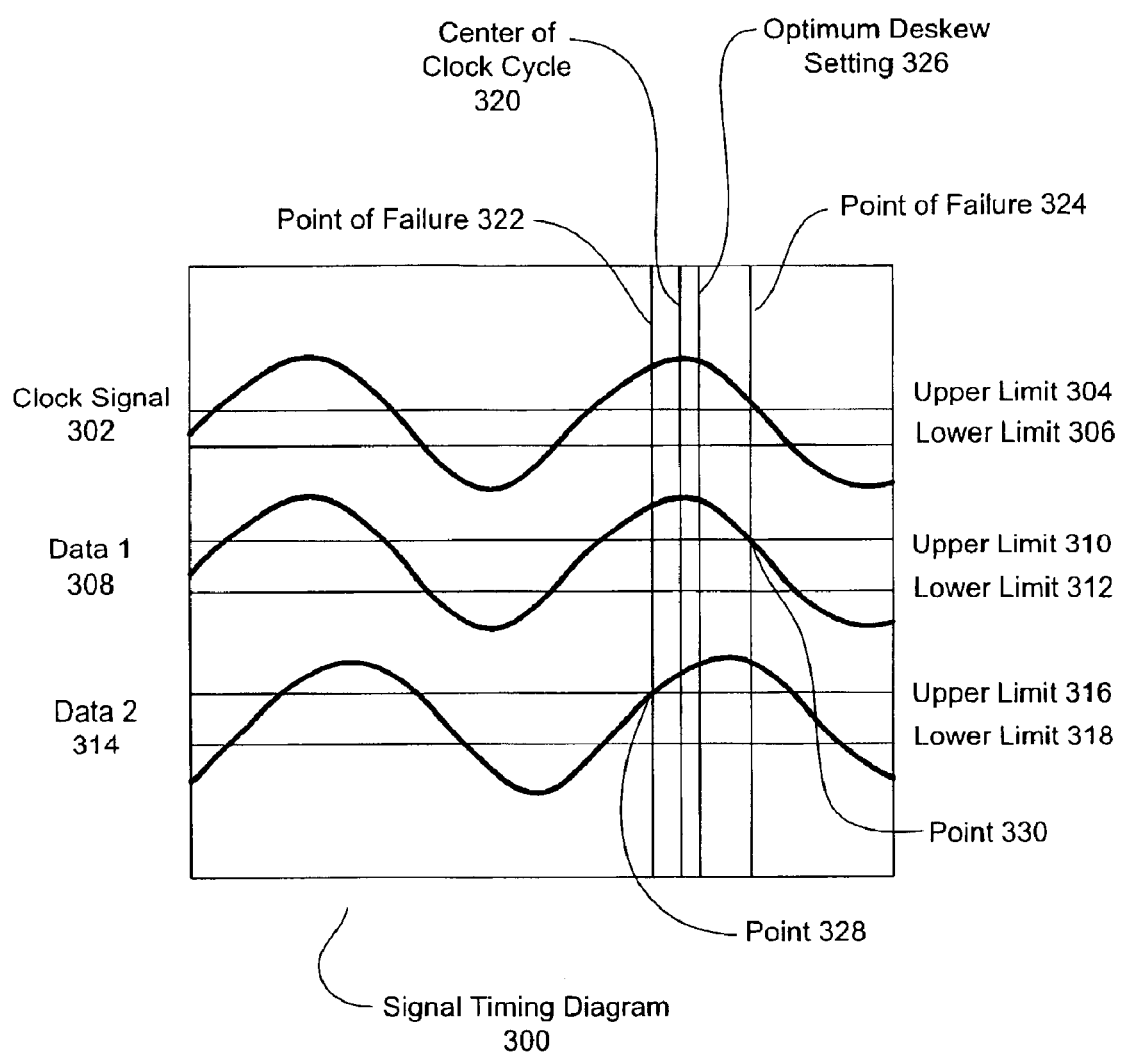
FIG. 3 is an illustration of a theoretical representation of several signal traces.

FIG. 3 is a theoretical representation 300 of several signal traces. A clock signal 302 is shown with its upper and lower thresholds 304 and 306. A first data signal 308 has its upper and lower thresholds 310 and 312. A second data signal 314 is shown with its upper and lower thresholds 316 and 318. The center of the clock period is shown in the vertical line 320. The line 320 may be the nominal point at which the data lines 308 and 314 are read by the receiver.

As the clock signal 302 is deskewed towards the left, the data is read at an earlier point in time. The lower point of failure 322 is detected when the second data signal 314 meets the upper limit 316 at point 328. Any deskew further to the left may result in errors.

As the clock signal 302 is deskewed towards the right, the data is read at a later and later point in time. The upper point of failure 324 is detected when the first data signal 308 meets the upper limit 310 at point 330. Any deskew further to the right may result in errors.

From the first point of failure 322 and the second point of failure 324, an optimum deskew setting 326 may be chosen. In the present example, the optimum deskew setting 326 is approximately equal to the midpoint between the first and second points of failure 322 and 324.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of empirically setting an optimum deskew setting on a parallel bus receiver comprising:
    setting a deskew setting to a central value;
    performing at least one read command;
    repeating the process of incrementing said deskew setting by a first incremental amount and performing said read command until said read command encounters at least one failure;
    saving said deskew setting as the high value;
    resetting said deskew setting to said central value;
    repeating the process of decrementing said deskew setting by a second incremental amount and performing said read command until said read command encounters at least one failure;
    saving said deskew setting as the low value; and
    calculating the optimum deskew setting using said high value and said low value.

2. The method of claim 1 wherein said parallel bus is a SCSI bus.

3. The method of claim 1 wherein said step of calculating comprises finding the median value of said high value and said low value.

4. The method of claim 1 wherein said method is performed when a device is attached to said receiver.

5. The method of claim 1 wherein said method is performed at predetermined intervals.

6. The method of claim 1 wherein said first incremental amount and said second incremental amount are equal.

7. A method of empirically setting an optimum deskew setting on a parallel bus receiver in an integrated system comprising:
    connecting a first device with a parallel interface to at least a second device with a parallel interface;
    setting a deskew setting on a parallel receiver of at least one device to a central value;
    performing at least one read command;
    repeating the process of incrementing said deskew setting by a first incremental amount and performing said read command until said read command encounters at least one failure;
    saving said deskew setting as the high value;
    resetting said deskew setting to said central value;
    repeating the process of decrementing said deskew setting by a second incremental amount and performing said read command until said read command encounters at least one failure;
    saving said deskew setting as the low value;
    calculating the optimum deskew setting using said high value and said low value; and
    setting said optimum deskew setting to said receiver.

8. The method of claim 7 wherein said parallel bus is a SCSI bus.

9. The method of claim 7 wherein said step of calculating comprises finding the median value of said high value and said low value.

10. The method of claim 7 wherein said first incremental amount and said second incremental amount are equal.

11. A receiver for a parallel bus capable of adjusting the optimum deskew value comprising:
    a clock signal input line;
    a plurality of data input lines; and
    a capability of setting a deskew setting to a central value, performing at least one read command, repeating the process of incrementing said deskew setting by a first incremental amount and performing said read command until said read command encounters at least one failure, saving said deskew setting as the high value, resetting said deskew setting to said central value, repeating the process of decrementing said deskew setting by a second incremental amount and performing said read command until said read command encounters at least one failure, saving said deskew setting as the low value, and calculating the optimum deskew setting using said high value and said low value.

12. The receiver of claim 11 wherein said parallel bus is a SCSI bus.

13. The receiver of claim 11 wherein said step of calculating comprises finding the median value of said high value and said low value.

14. The receiver of claim 11 wherein said setting a deskew value is performed when a device is attached to said receiver.

15. The receiver of claim 11 wherein said setting a deskew value is performed at predetermined intervals.

16. The receiver of claim 11 wherein said first incremental amount and said second incremental amount are equal.

* * * * *